Oct. 17, 1967  J. W. WALLACE  3,346,980
LIVESTOCK EAR TAG
Filed Aug. 16, 1965  2 Sheets-Sheet 1
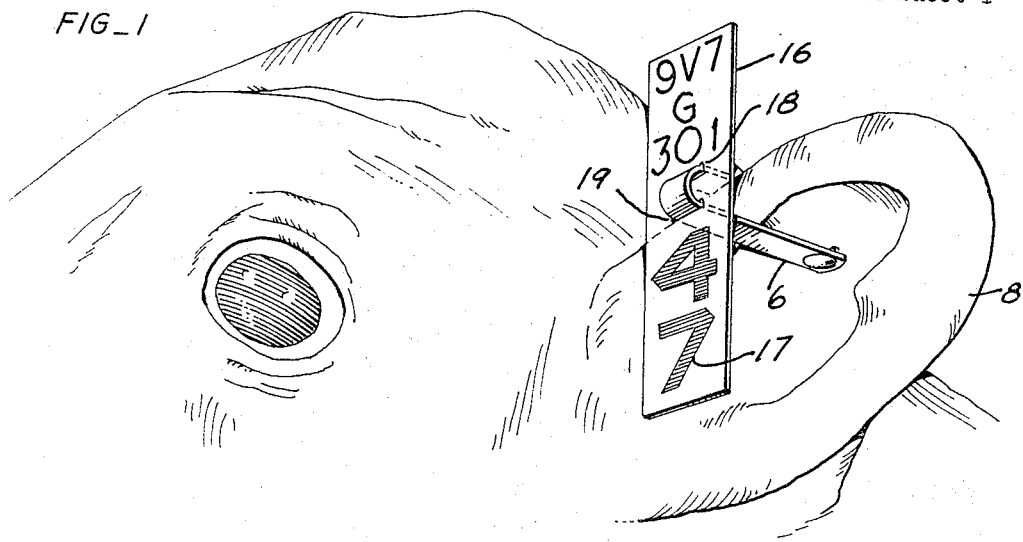
FIG_1
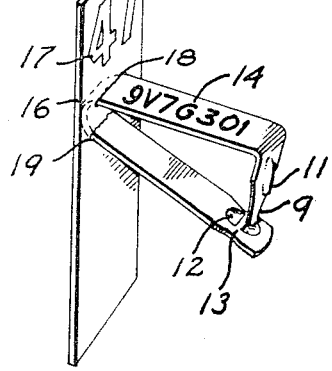
FIG_2
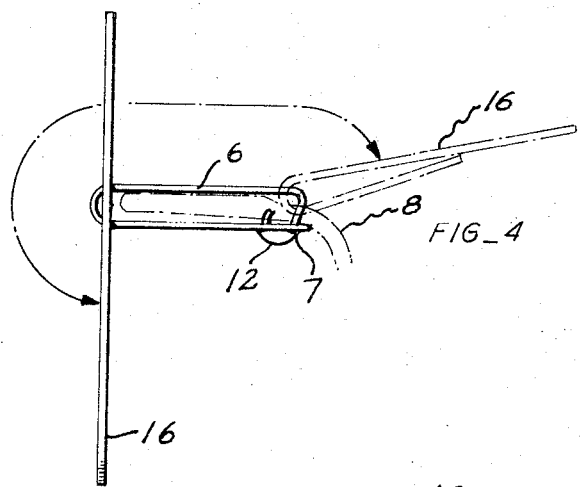
FIG_4
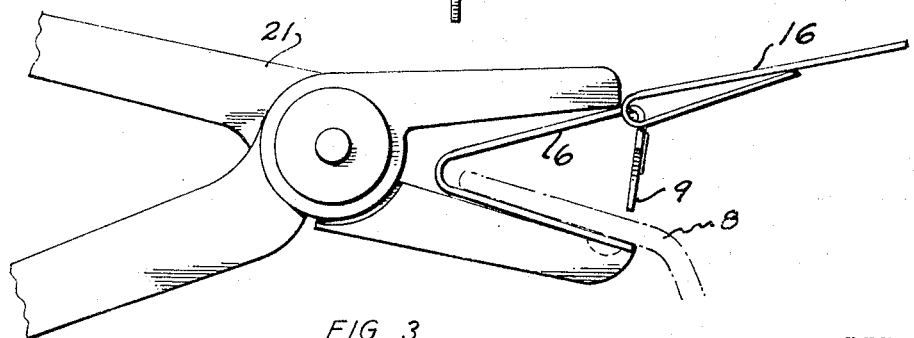
FIG_3
INVENTOR.
JOHN W. WALLACE
BY *Lothrop & West*
ATTORNEYS Oct. 17, 1967  J. W. WALLACE  3,346,980
LIVESTOCK EAR TAG
Filed Aug. 16, 1965  2 Sheets-Sheet 2
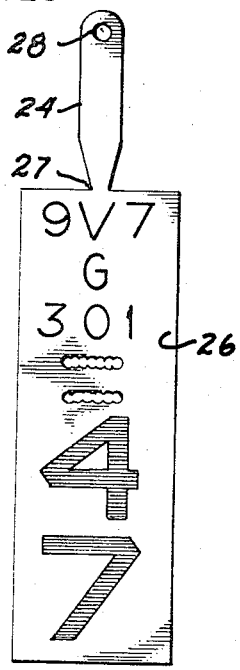
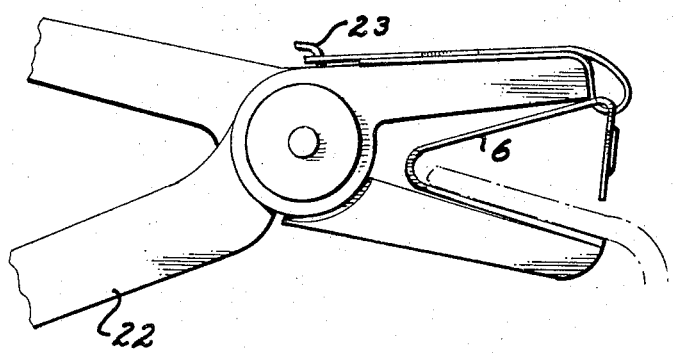
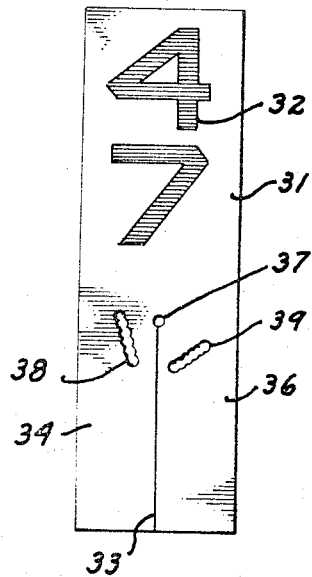
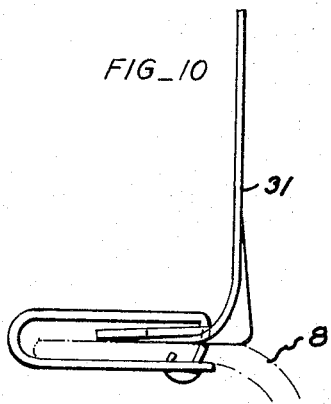
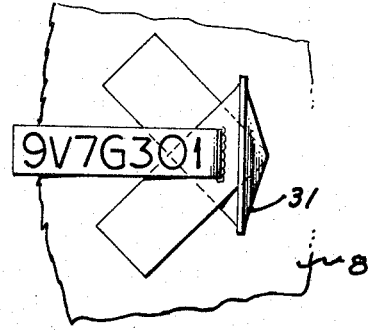
INVENTOR.
JOHN W. WALLACE
BY Lothrop & West
ATTORNEYS

United States Patent Office 3,346,980
Patented Oct. 17, 1967

3,346,980
LIVESTOCK EAR TAG
John W. Wallace, 3426 Marysville Blvd.,
Sacramento, Calif. 95838
Filed Aug. 16, 1965, Ser. No. 479,732
3 Claims. (Cl. 40—302)

ABSTRACT OF THE DISCLOSURE

A tag with a base support portion attached in substantial face to face engagement with the ear of a head of livestock by a clinched metal loop, the tag also including an upstanding portion bearing an identifying indicium thereon.

My invention relates to means for tagging or labelling livestock of all sorts, particularly for use in identifying individual animals when they are some distance from an observer and particularly when they are mixed in with other animals.

It has long been the practice to utilize a metal loop clinched through the flesh of the ear of an animal; for example, a steer, and bearing individual markings such as inoculation numbers or the like pertinent to that particular animal. Usually these numbers are simply stamped into the metal of the ear loop, and while they can be readily read when the animal is within a very short distance of the observer, they cannot be detected at any substantial distance.

There are instances in which it is desirable to segregate or identify individual animals from a herd or group, and it is highly desirable to be able to distinguish and identify each animal from a substantial distance.

It is therefore an object of my invention to provide a livestock ear tag bearing an indicium that is readily discernible from a relatively long distance and which is so displayed that it can be easily read even though the animal bearing it is mixed in with a large group of other animals.

Another object of the invention is to provide a livestock ear tag which will afford a large display of an identification of a particular animal.

A still further object of the invention is to provide a livestock ear tag that can readily be utilized in conjunction with and in addition to the ear loop customarily utilized at the present time.

A still further object of the invention is to provide a livestock ear tag that can quickly be applied to an animal and with little or no difficulty.

An additional object of the invention is to provide a livestock ear tag permanent in its characteristics and quite cheap to provide and that can readily be handled by people of only ordinary skill.

Another object of the invention is to provide a livestock ear tag which will maintain a position for ready visibility despite movements of the animal to which it is applied.

Another object of the invention is to provide a livestock ear tag that is an improvement over devices presently available.

Other objects, together with the foregoing, are attained in the embodiments of the invention described in the accompanying description and illustrated in the accompanying drawings, in which:

FIGURE 1 is a perspective view of a portion of an animal's head and ear showing one form of livestock ear tag pursuant to the invention applied thereto;

FIGURE 2 is an isometric perspective view of an ear loop and tag arranged for application to an animal's ear;

FIGURE 3 is a side elevation of an ear tag and loop arranged in connection with an applicator for application to an animal's ear;

FIGURE 4 is a side elevation of structure substantially as disclosed in FIGURE 3 but in a later stage of application;

FIGURE 5 is a plan of a modified form of ear tag constructed in accordance with the invention;

FIGURE 6 is a side elevation comparable to FIGURE 3 showing a special applicator with the modified form of ear tag shown in FIGURE 5;

FIGURE 7 is a plan of a still further modified form of livestock ear tag;

FIGURE 8 is an isometric perspective view showing the form of ear tag of FIGURE 7 in position as applied to the ear of an animal;

FIGURE 9 is a plan of the structure disclosed in FIGURE 8; and

FIGURE 10 is a side elevation of the arrangement shown in FIGURES 8 and 9.

At the present time, it is usual to provide a metal loop 6 of flat strap material bent upon itself in substantially a U shape and provided with a clinching mechanism 7 so that the loop can be passed through an opening in the ear 8 of an animal and permanently affixed thereto. One part of the loop is formed with a sharp point 9 and a barb 11 of deformable material. Another part of the loop carries a hemispherical depression 12 with a diametrical bridge 13 extending across it. The loop also usually bears a legend 14, usually a number constituting some sort of designation or identification. The legend is ordinarily stamped in numbers or letters about a quarter inch or less in height. The open loop, as shown in FIGURE 2, is passed over the ear 8 of the animal and then the point 9 is driven into the hemispherical depression 12, being forced to curl under the bridge 13 and thus to form a permanent hook. In this fashion, the loop 6 is held on the animal's ear.

To provide an improved indication and to supplement the legend on the loop 6 and in order not to interfere in any fashion with the functioning or operation of the loop 6, I provide a particular form of tag. In the form shown, for example, in FIGURES 1–3, the tag 16 is a generally rectangular, flat strip of bendable material, usually plastic, preferably contrived in three layers. The outer two layers are extremely thin and transparent, so that they afford abrasion and weather protection for an intermediate or central layer which bears an indicium 17 of any suitable sort. The rectangular tab is provided adjacent its center with a pair of transversely extending apertures 18 and 19 spaced apart a short distance and of a size readily to receive the material of the loop 6. The length of the tag is preferably such that it is comparable to the transverse width of the ear of the animal on which it is to be employed.

In use, the flat tag is slipped or threaded over the open loop 6 substantially as shown in FIGURE 2 and is lodged in a diametrical position extending across the sharply curved end of the loop. The spacing of the openings 18 and 19 is substantially equal to that of the two legs of the loop, so that the tag is freely positioned and is readily located.

When the loop 6 is to be installed, the tag 16, being flexible, is bent manually, as shown in FIGURES 3 and 4, into a position near the pointed end of the loop. Here it is out of the way of an applicator tool 21, as shown in FIGURE 3. After the loop itself has been installed on the animal's ear, the tag in its bent condition is threaded back to the location shown in FIGURES 2 and 4 and is released from any restraint. It is sufficiently resilient to spring into and return to its original flat or substantially planar position, particularly as illustrated in FIGURE 1.

The various indicia thereon are thus displayed not only in large characters, but also in a prominent location and in a position to be viewed from a relatively great distance.

With this arrangement, the tag bearing the large indicia is readily discerned but does not in any way interfere with any notation 14 that may be on the loop and in no wise interferes with the initial application of the loop nor its subsequent functioning. The tag, being flexible, does not in any way interfere with the animal and yields without damage to any disturbing forces and returns to normal position when released.

In some instances, because of fractious animals and the like, it is desirable to provide a very quick manner of supplying the extra tag along with the ordinary loop. As before, the loop 6 is positioned in an applicator 22 (FIGURE 6) for installation. This applicator is just like the applicator 21 of FIGURE 3 except that in addition it has a hook 23 on one of its jaws. The hook is in a position to be engaged by a tear tab 24 projecting from one end of a tag 26 substantially the same as the tag 16. There is a tear zone 27 between the tag 26 and the tab 24. The tab has a hole 28 in it to receive the hook 23.

In the use of this form of device, the tag 26 is threaded onto a loop just as previously described, and the tag is furthermore flexed and engaged with the hook 23 by means of the hole 28 in the tear tab 24. When the user installs the loop through the animal's ear and thus simultaneously installs the tag 26, if the animal jerks away, as is often the case, then the tear zone 27 severs, leaving the tag 26 properly positioned and leaving the tear tab 24 on the hook 23. When the animal jerks away, the tag 26 is normally drawn to the end turn of the loop 6 and, because of its resiliency, springs substantially into a planar position as illustrated in FIGURE 1. The removed tear tab 24 can be shaken off or manually detached from the hook 23 so that the applicator is available for a subsequent use.

As a further modified form of ear tag, I preferably provide a structure as shown in FIGURES 7–10 inclusive. In this instance, the ear tag is a rectangular sheet 31 comparable to the tag 16. It carries an indicium 32 and also has a longitudinally extending slit 33 which divides the end portion of the tag into a pair of tabs 34 and 36. The slit 33 terminates in an opening 37 to prevent tearing. Each of the tabs 34 and 36 has one of a pair of apertures 38 and 39 similar to the apertures 18 and 19. In this instance the apertures, instead of being arranged transversely, are arranged at substantially right angles to each other and are disposed on each of the tabs at an angle to the longitudinal dimension. In use, the two tabs 34 and 36 are lapped over each other upon installation so that the openings 38 and 39 register with each other and are then passed together over the material of a loop 6. When this is done, the tabs 34 and 36 form a sort of base support held in position by the loop. The remaining part of the tag is upstanding from this base support and supplies a superior location for display of the indicium 32.

What is claimed is:
1. A livestock ear tag comprising:
 (a) a loop of flat stock engageable with an animal's ear and having at each end a sharply curved portion between two substantially parallel portions lying on opposite sides of the animal's ear in close juxtaposition thereto, one of said sharply curved portions extending around the edge of the ear, the other of said sharply curved portions having a formation to pierce the ear of the animal and clinch said loop closed; and
 (b) a sheet of material including a base support portion interposed between one of said parallel portions of said loop and the underlying surface of the ear, said base portion being pierced by said loop, and an upstanding portion connected to said base portion, said upstanding portion being approximately at right angles to said base portion and bearing an identifying indicium.

2. A livestock ear tag as in claim 1 in which said base support portion comprises a pair of elongated tabs arranged in crossed overlapping relation.

3. A livestock ear tag as in claim 2 in which each of said tabs includes an elongated diagonally disposed aperture approximately equal in length to the width of said loop stock, said apertures being angularly arranged to register with each other when said tabs are in said crossed over relation to receive said loop.

References Cited
UNITED STATES PATENTS

| | | | |
|---|---|---|---|
| 1,320,426 | 11/1919 | Spurling | 40—302 |
| 1,458,444 | 6/1923 | Scott | 40—20 |
| 2,022,269 | 11/1935 | Bender et al. | 40—20 |
| 2,348,627 | 5/1944 | Holland et al. | 40—21 X |
| 2,637,922 | 5/1953 | Bryden | 40—302 |

EUGENE R. CAPOZIO, *Primary Examiner.*

W. GRIEB, *Assistant Examiner.*